July 31, 1951     W. P. SWEARINGEN     2,562,587

BONDED ABRASIVE

Filed July 19, 1948

WITNESSES:

E. C. Luiding.

INVENTOR
Willard P. Swearingen.

BY Frederick Shapoe
ATTORNEY

Patented July 31, 1951

2,562,587

UNITED STATES PATENT OFFICE 2,562,587

BONDED ABRASIVE

Willard P. Swearingen, Pittsburgh, Pa., assignor, by mesne assignments, to Industrial Research and Engineering Company, Pittsburgh, Pa., a company of Pennsylvania Application July 19, 1948, Serial No. 39,452

8 Claims. (Cl. 51—309)

This invention relates to the manufacture of bonded abrasives, and tools and members embodying bonded abrasives.

In the manufacture of bonded abrasives, and tools and members incorporating bonded abrasives, it is necessary that the abrasive particles be well bonded to one another, and to such tools or members with which they cooperate. The prime requirement for this purpose is that the abrasive particles be adherently coated with a suitable bonding medium, whereby each one is supported for most efficient use as well as being held securely in place so that the abrasive particle is durably attached to withstand shocks and pressure applied during use.

The outstanding difficulty in bonding abrasive particles to one another and to support members has been the difficulty of securing good wetting between the bonding medium and the abrasive particles. It is well recognized that when a cementing or bonding agent wets the particle to which it is applied, there is obtained the maximum degree of adherence. Wetting of an abrasive particle by a bonding medium causes a rising meniscus of the bonding medium to occur and enables a buildup of the bonding medium about the sides of the particle. Due to such wetting, the particle is well supported by the bonding medium and, in effect, it is disposed at the peak of a pyramidal structure of which the particle forms the peak and the central portion of such pyramid, and the bonding medium forms buttressing sides and the base. For abrasive purposes, this pyramidal bonding of abrasive particles produces the optimum usefulness and longest life with the maximum cutting action by the abrasive particles in use. Conversely, if the abrasive particle is not wetted properly by an applied bonding medium, the surface of the bonding medium is depressed at the surface of the abrasive particle, thereby providing very little lateral support and no true cementitious adhesion, and the particle is held weakly in place, merely by the resistance of the bonding medium to dislodgement of the particle.

An object of the present invention is to provide for conditioning the surfaces of abrasive particles so that the particles are wetted by a bonding medium and, in particular, brazing metals.

A further object of the invention is to provide for bonding abrasives by means of a brazing metal by subjecting the surfaces of the abrasives to the vapors of zinc or cadmium metal.

A still further object of the invention is to provide for brazing abrasives by conditioning the surfaces of the abrasives with vapors of zinc or cadmium metal, and then flowing a brazing metal over the conditioned surfaces whereby wetting and adhesion of the brazing metal take place thereto so that, on cooling, a tenaciously adherent brazing metal bond to the abrasive is produced.

Other objects of the invention will in part be obvious, and will in part appear hereinafter.

For a better understanding of the nature and objects of this invention, reference should be had to the following detailed description and drawing, in which.

Figure 2:
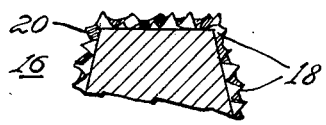
Fig. 2 is a magnified fragmentary cross-section through the dental burr of Fig. 1.

It has been discovered that abrasives from the group consisting of diamond, alumina and metal carbides may be conditioned by the passage over their surfaces of zinc or cadmium vapors, or both, in a non-oxidizing atmosphere, for wetting by a melted brazing metal. When so conditioned, the abrasive is readily wetted by applied brazing metal so that a good bond may be effected therebetween; and, upon cooling, the abrasive will be tenaciously bonded to the brazing metal.

The process of this invention may be applied to diamond, both in the form of relatively large pieces, such as bort, and in the form of diamond dust of any desired fineness. The alumina may be synthetic alumina, including synthetic sapphire, or may be natural material, such as corundum or garnet. Numerous abrasive metal carbides may be treated in the practice of the invention. The metal carbide may be in the form of large pieces or in small chips or a fine powder. Examples of suitable metal carbides are silicon carbide, tungsten carbide, titanium carbide, tantalum carbide, and mixed metal carbides. For many purposes, mixtures of any two or more of the various abrasives disclosed herein may be employed.

Suitable brazing metals to bond to the conditioned abrasive in the practice of the invention are metals that melt above 770° C., if cadmium is used, and above 910° C., if either zinc, or zinc and cadmium is used, and having a boiling point of above 1100° C. Both single metals and alloys are suitable. Copper and silver are particularly advantageous as brazing metals. Alloys of copper, such as phosphorus-copper, and copper brazing alloys containing from 5% to 50% silver and the balance being copper, with or without phosphorus, are suitable. Iron, nickel, cobalt and gold, or alloys thereof, may be advantageously used.

It has been found desirable that the brazing of the abrasive take place in a non-oxidizing or reducing atmosphere. Particularly suitable atmospheres are those containing only hydrogen, nitrogen, argon, helium, oxygen-free and water vapor-free combusted gases, or mixtures thereof. I have employed atmospheres composed entirely of hydrogen, and also cracked ammonia (hydrogen plus nitrogen) with excellent results.

While in some instances the abrasive particles need only be bonded by the brazing metal to one another, for the majority of industrial purposes it is required that the abrasive be bonded to some base member or tool. The base members may be any suitable metal, such as iron or steel, nickel, platinum, tungsten, molybdenum, copper, chrome, or other metal. The brazing metal should be of lower melting point than the base member, otherwise the base member will melt during the heat-treatment before the brazing metal melts and thereby lose its shape. Thus, if the base member is composed of copper, a lower melting point silver solder may be employed for bonding the abrasive to the base member. For some purposes, the base member may be a refractory or abrasive material, such as porcelain or the like. The porcelain may be preliminarily treated by applying thereto a layer of platinum or other adherent metal, although pretreatment with zinc or cadmium vapors will enable the brazing metal to adhere thereto.

It has been found that the zinc or cadmium vapors must be given off abundantly before the brazing metal is melted and the zinc or cadmium vapors should have passed over the surface of the abrasive preceding the flow of melted brazing metal over the abrasive. A zinc brass, for example, a 30% zinc brass, is not suitable for use as a source of zinc vapors in practicing the present invention since it melts before any appreciable amount of zinc vapor is given off. Tests with brass have shown it not to bond satisfactorily to abrasive, whereas mixtures of powdered zinc and powdered copper produce an outstanding bond. However, a brass, such for example as a 10% zinc and 90% copper alloy, melting at about 1050° C., will braze excellently to abrasive pre-treated with vapors from a separate amount of free zinc.

The amount of either zinc or cadmium metal required to condition the abrasive will depend on several factors, such as the amount of abrasive used, the space in which the abrasive is disposed, the distance between the zinc or cadmium and the abrasive and the base member, and so on. A good rule is to have sufficient zinc or cadmium, or both, so that the metal vapors thereof will fill the space between the abrasive particles. An excess of the vaporizable metal above this is not detrimental, but is beneficial. Therefore no precise amount of either zinc or cadmium, or both, can be specified.

By zinc we mean the pure metal or zinc alloyed with small amounts of other metals, not over 30% by weight, or incidental impurities. Thus an 80% zinc-20% copper alloy is suitable for use as a source of the zinc vapors. Pure cadmium or alloys of cadmium with not over 30% by weight of other metal or impurities is similarly used.

Figure 1:
Figure 1 is a view in elevation of a dental burr.

Referring to Figure 1 of the drawing, there is illustrated a typical dental burr 10 comprising a cylindrical body 12 with a tapering neck 14 at one end thereof and terminating in a head 16 in the shape of a frustum of a cylindrical cone. Heads that are spherical, cylindrical, or of any other shape, may be treated. Bonded to the head 16 is a well distributed layer of diamonds 18 which, as illustrated in cross-section in larger scale in Fig. 2, are adherently cemented or bonded thereto by means of the solidified brazing metal 20. The drawing corresponds to structure observed under the microscope. The brazing metal 20, it will be noted, has crept up the sides of the diamond particles 18 showing wetting to have taken place between the brazing metal and the diamonds, as evidenced by the rising meniscus effect. The diamond particles are supported in the most desirable manner due to such wetting action, whereby the peaks of the diamonds which do the cutting or abrading are disposed at the peak and center of a pyramid-type formation, the base and supporting sides comprising the highly adherent layer of brazing metal 20.

Burrs, such as illustrated in Figs. 1 and 2 of the drawing, may be produced by any one of a number of procedures in accordance with the principles of the present invention. One convenient method is to prepare a mixture of zinc powder, or cadmium and zinc power, copper powder and diamond grit of a suitable fineness, for example, from 60 to 200 mesh. The head 16 of the dental burr may be introduced into the mixture of powders until it is barely covered. The assembly so produced is then introduced into a suitable furnace from which oxygen may be flushed out by a stream of hydrogen, or cracked ammonia, or an oxygen and water vapor free combusted gas, or other suitable non-oxidizing gas, and the temperature of the furnace gradually increased. At about 400° C., the zinc begins to vaporize slowly, but the most effective flow of vapor does not occur until near the boiling point of zinc at about 907° C. The temperature of the furnace is maintained between 900° C. and below the boiling point of the brazing metal so that the zinc vaporizes copiously, or even completely, before the temperature reaches the melting point of the copper. Using cadmium alone, the boiling point being about 770° C., a lower temperature range is adequate to accomplish the same result. During vaporization of the zinc, the surfaces of the diamond particles, the burr head 16, and the copper powder are all subjected to the action of the zinc vapor. The zinc vapor appears to condition the surface of the abrasive and the base member for good wetting by melted copper. Thereafter, upon increasing the temperature of the furnace to the melting point of the copper, the molten copper will readily wet the head 16, thereby applying a continuous film of copper over the surface in contact with the copper. I have found, in some cases, that the copper will flow up the neck 14 for a distance, thus indicating the highly effective conditioning action of the zinc vapors. The diamond particles are also wetted by the melted copper, and such diamonds as are in the vicinity of the head 16 or in contact therewith will be united to the head 16 by a continuous layer of molten copper. Upon cooling to a temperature below the melting point of copper, the diamonds will be united to the head 16 by the solidified copper metal. The dental burr 12 may be removed from the furnace upon reducing the temperature to room temperature, or slightly above, where there is no danger of any undesirable effects of atmospheric oxygen.

Examination of the burr so produced, under a microscope, will reveal the flow of copper up the sides of the diamond particles, as illustrated in Fig. 2 of the drawing. Attempts to dislodge the diamonds have shown that diamonds located adjacent the head 16 will withstand an astonishing amount of force. They must be torn out of the adhering copper brazing metal, usually some copper parting away with the diamond.

On the other hand, burrs made in an identical way except that free zinc or cadmium were not present during brazing, when removed from a furnace, will show no wetting of copper. Merely rolling the burr head between the fingers will remove almost all the diamond grit.

The invention may be practiced in an alternative mode by plating the head 16 with one or two mils of copper, the thickness of the copper depending upon the size of the diamond particles to be bonded thereto, and immersing the head in a mixture of powdered zinc and diamond grit. The heat-treating process may be carried out as indicated in the previous example. The results obtained by this modification are particularly advantageous since the head is coated with substantially a single layer of diamonds.

I have practiced the invention in another way, comprising the steps of electroplating a thin layer (from 0.1 to 2 mils) of zinc or cadmium on the head 16 and immersing the head in a mixture of diamonds and copper powder, and heat-treating as disclosed previously. Good results have been obtained with this form of the process.

In a still different modification, the head 16 was electroplated with a layer of copper; then a layer of zinc or cadmium was applied, for example, one-half mil in thickness, and the plated head was immersed into a small body of diamond grit. Upon heat-treatment to first evaporate the zinc and then to melt the copper, an excellent bonded coating of diamond grit was secured. Numerous modifications of these processes will be apparent. It will be appreciated that the prime requirement is that the abrasive and, in some cases, the surfaces of the members to which the abrasive is to be affixed, are first subjected to an abundant flow of the vapors of free zinc or cadmium, or both, to condition them for wetting and then a suitable melted brazing metal is applied to the abrasive and the member so that the abrasive is wetted by molten brazing metal with the abrasive being adjacent the surfaces of the member where its presence is desired where it will be present on solidification of the brazing metal.

In the above examples, mixtures of alumina or metal carbides, or both, with the diamond grit may be bonded with equal success. Thus, 100 mesh diamond grit may be admixed with 120 mesh alumina or 120 mesh silicon carbide. These mixtures result in an abrading surface composed of larger particles of diamond grit and somewhat smaller particles of the other abrasive. The benefits of the abrasive other than the diamond is that it prevents the too rapid wearing away of the copper brazing metal in service. The diamond constitutes the primary cutting medium.

By the process of this invention, dental burrs with brazed alumina grit as the entire abrasive were produced in which the grit was tenaciously bonded to the burr head. In other instances, metal carbides, such as 100 mesh silicon carbide, have been brazed to dental burrs with an extremely good bond being obtained.

After the burr with the brazed abrasive has been produced as disclosed herein, there may be applied to the head an electrodeposit of a reinforcing metal, such as nickel, chromium, cobalt, or other alloys. This is particularly desirable where the amount of brazing metal has been kept at a minimum to insure that only a single layer of diamond particles is brazed to the head. By electroplating a thin layer of nickel on a burr head brazed with 100 mesh diamond grit, there may be produced a burr head in which the tips of the diamonds just project beyond the metal deposit. This procedure produces a burr having an outstanding life. It will be appreciated that, occasionally, only a small portion of a diamond particle may be in contact with the brazing metal, and the electroplating of additional metal will build up a supporting layer so that the diamond particle may be securely held against dislodging in use. Otherwise, the diamond particle would be readily broken away from the brazing metal due to the insufficient contact area with the brazing metal.

The present invention is not only advantageous with fine diamond grit or powder, and other similar powdered abrasives, but presents great advantages in the preparation of scribes, dressing tools for grinding wheels, and the like.

Figure 3:
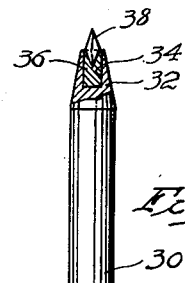
Fig. 3 is a view in elevation, partly in section, of a scribing tool.

Referring to Fig. 3 of the drawing, there is illustrated a scribe or dressing tool comprising a steel shaft 30 terminating in a tapering tip 32 provided with a socket 34. Heretofore, in setting large single diamonds in the tip of a tool such as shown in Fig. 3, it was the practice to pour in brazing metal about a diamond placed in the socket, relying almost entirely upon the mechanical engagement of the diamond by the solidified brazing metal. In other cases, it has been the practice to place the diamond in the socket, and then carefully to peen the metal about the socket to force it into close contact or engagement with the diamond without cracking or fracturing the diamond.

In the practice of the present invention, however, the socket 34 is filled with a mixture of zinc or cadmium, or both, and a suitable brazing metal. Thus, zinc dust and copper powder may be admixed, or a small foil of zinc metal is placed in the socket, along with copper, silver, or other brazing metal in any suitable physical form, also placed therein. A selected diamond bort or chip 38 is then placed within the socket, and the assembly heat-treated in a non-oxidizing atmosphere at an increasing temperature. At 400° C. to 907° C., the zinc or cadmium will evolve vapors which condition the walls of the socket 34 and the diamond surfaces for good brazing. After the zinc or cadmium has been completely evaporated, the temperature of the furnace is increased until the brazing metal is melted and the diamond is wetted by the brazing metal. The diamond may be positioned manually or in any suitable manner in the molten metal which is then allowed to cool until it solidifies. The resulting product will be a well-bonded diamond which will not become loose and be dislodged and lost, even after considerable use and wear, as can readily occur when set by prior art procedures.

Figure 4:
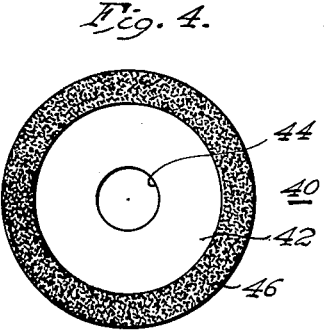
Fig. 4 is a plan view of a grinding wheel.
Figure 5:
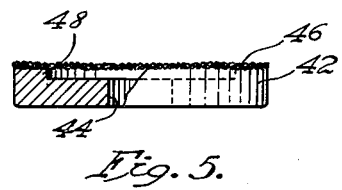
Fig. 5 is an elevation, partly in section, of the grinding wheel of Fig. 4.

Various grinding wheels or the like abrading members may be produced by the practice of the present invention to provide thereon a highly tenaciously bonded abrasive. Referring to Figs. 4 and 5 of the drawing, there is illustrated a side grinding wheel 40 consisting of a base 42 of steel or other suitable material, and having an opening 44 for mounting the wheel on a shaft. A rim 48 is present for receiving a layer 46 of suitable abrasive. The abrasive in the layer 46 may be applied by following any of the practices disclosed previously with regard to the dental burr of Figs. 1 and 2. Thus, the rim 48 may be electroplated with copper, and then a layer of zinc or cadmium, or both, may be applied either by electroplating or in the form of loose powder; and finally, disposing a layer of suitable abrasive, such as diamond, tungsten carbide, alumina, or any mixture thereof, in suitable sizes and distribution. Upon heat-treating the assembly in a non-oxidizing atmosphere, to a temperature of above 400° C., vapors of zinc or cadmium will be evolved, thereby conditioning the abrasive for wetting and bonding by a layer of melted copper, upon further heating. Subsequent cooling to solidify the copper will produce a layer of tenaciously bonded abrasive on the rim 48.

Figure 6:
Fig. 6 is a view, in perspective, of a bonded abrasive member.

In some instances, there is a need for bodies or members composed entirely of abrasive and a matrix of brazing metal. For example, in the making of diamond saws, a steel blade, either circular or in the form of an endless strap, may be provided by brazing or by mechanical attachment with a plurality of bonded teeth or segments of abrasive material. Illustrated in Fig. 6 of the drawing, is a member 50 comprising particles of abrasive, such as diamond, metal carbide, or alumina, or mixtures thereof, brazed into a unitary member by means of copper, silver, steel, or the like. The member 50 is suitable for placing on the surfaces of a saw blade where it may be soldered or brazed to the steel, or by resistance or other welding, to form an abrasive tooth. The member 50 may be produced by admixing a suitable abrasive, such as diamond grit, with powdered silver solder or the like, and a small amount of zinc or cadmium powder, and disposing the mixture within a cavity in a graphite mold. Upon subjecting the mold to progressive heating in a non-oxidizing atmosphere, the zinc or cadmium will evolve vapors to condition the surfaces of the abrasive by wetting by the brazing metal. Upon complete evaporation of the zinc, the brazing metal will melt and flow over the abrasive, wetting all the surfaces, and the entire contents of the mold will be united into a well bonded unitary member upon cooling below the melting point of the brazing metal, thus providing the member 50 which may then be brazed or welded to a base. In some cases, the member 50 may be used by itself as an abrading tool or hone.

Figure 7:
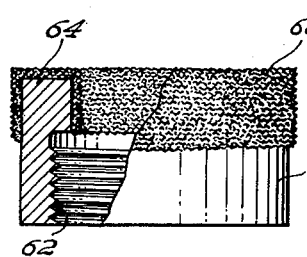
Fig. 7 is a view in elevation, partly in section, of the tip of a diamond core drill.

Referring to Fig. 7 of the drawing, there is illustrated a drill head 60 suitable for diamond drilling and the like. Conventionally, such drill heads are prepared by drilling holes in a circular collar at frequent intervals and placing a suitably sized diamond bort or other particle, and fixing the diamond particle in place by peening or brazing, physical engaging forces being relied upon almost entirely for retaining the diamond in the head. As is well known, diamonds are frequently lost from drill heads so prepared, and the heads must be removed from service from time to time and the diamonds relocated when the supporting metal has been worn away to the extent that a part of the peened-over metal is gone and there is danger the diamonds will fall out or be easily pulled out in use.

In accordance with the present invention, the diamond core drill head 60 having a threaded interior bore 62 and an enlarged boring head 64 is processed to bond thereto diamonds by solidified brazing metal to form a highly adherent abrasive cutting layer 66 thereof. A suitable method is to electroplate a good brazing metal, such as copper or silver, or any suitable alloy, to a thickness of approximately one-half of the diameter of the diamond particles to be applied to the drill head. Thereafter, a thin layer of zinc or cadmium, or both, is electroplated over the brazing metal. Then a layer of diamonds of the proper size is disposed over the entire surface. The diamonds may be located manually and held in place by a suitable band or cup. In other cases, a clay form having an annular cavity a little larger than the head 64 may be studded with the diamonds, then dried and finally the head placed in the clay form. The entire head is then heat-treated at an increasing temperature in a non-oxidizing atmosphere. Upon reaching a high enough temperature, zinc or cadmium vapors, or both, are emitted and pass over the surfaces of the diamonds conditioning them for wetting by the brazing metal. As the temperature is increased, the zinc or cadmium is evaporated, and thereafter the brazing metal melts. The diamonds may be pushed into the molten metal manually or otherwise; or, if contained in a mold, the diamonds will be maintained in position to be wetted over a major proportion of their surfaces by the melted brazing metal. More melted brazing metal may be poured into the mold. Upon cooling, the brazing metal will solidify, thereby covering at least half the surface of the diamonds. Upon cooling and removal from the furnace, the head 60 may be further provided with electroplated metal to increase the degree of support provided for the diamonds in the layer 66. It will be found that the resulting head, with or without electroplating, is superior to those produced in accordance with prior art practice. The diamonds will be extremely well bonded to the brazing metal and cannot be dislodged or lost until worn down completely, except for application of forces stronger than bond with the brazing metal. Furthermore, the degree of skill and effort required to produce the head will be much less than that required in previous processes where each diamond was, in effect, individually applied and fixed.

Numerous other abrasive tools and members, and the like, may be produced by the practice of the present invention. The shape, size, number of layers or thickness of the abrasive may be modified to meet requirements. It will be appreciated that, in some instances, base members may be separately pre-treated with zinc or cadmium vapors, and the abrasive may be separately conditioned by zinc or cadmium vapors, and the two brought together in a separate succeeding step. Also such treatment may be continuous if desired, as in producing abrasive belts of steel or the like wherein the surfaces are covered with abrasive material brazed thereto. Thus a steel band may be pulled through a furnace where it is first exposed to zinc vapors, then melted brazing metal and abrasive disposed on the belt and finally cooled.

Figure 8:
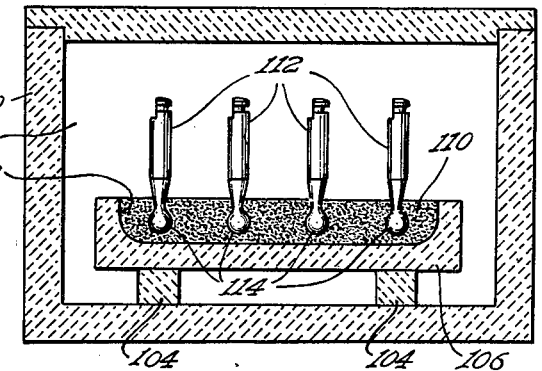
Fig. 8 is a fragmentary cross-sectional view of a fixture.

Illustrated in Fig. 8 is a suitable mode of practice of the invention. A furnace 100 having a space 102 containing a non-oxidizing atmosphere, such as hydrogen, nitrogen or the like, is heated by any suitable means (not shown). Resting on supports 104 is a graphite member 106 provided with a depression 108. The depression 108 contains a layer 110 comprising a mixture of zinc or cadmium, or both, in any suitable form, such as a powder or strip; brazing metal, such as copper; and any suitable or desirable abrasive, such, for example, as diamond grit. Burrs 112 having a spherical head 114 are placed in the mixture 110. When the assembly shown in Fig. 8 is heated at an increasing temperature, the zinc or cadmium, or both, in the layer 110 begins to evaporate at above 400° C., and is completely volatilized at atmospheric pressures at about 907° C. The zinc or cadmium vapors passing over the surfaces of the abrasive condition the abrasive for wetting by the brazing metal. Thereafter, the increasing temperature causes the brazing metal to melt, and any diamonds adjacent thereto will be wetted. It has been found that the brazing metal, such as copper, will rise up the neck of the burr 112 a considerable distance of as much as one-half inch due to the good wetting action promoted by the zinc or cadmium vapors. The copper wets the diamonds and a heavy well-distributed layer of diamonds will be applied to the head 114. The diamonds will be well bonded by the brazing metal to the head 114 upon cooling of the furnace to a temperautre below the melting point of the copper. The burr 112 may be used upon cooling and removal of the furnace, or additional metal may be plated upon the head to give a better support to the diamonds, as well as imparting better corrosion resistance to the burr head, thereby securing a longer useful life.

It will be obvious that other forms of the invention may be practiced, and the specification and drawing are to be taken as being exemplary and not exhaustive.

I claim as my invention:

1. The method of bonding at least one abrasive from the group consisting of diamond, alumina and metal carbides to a base member by means of a brazing metal of lower melting point than the base member, comprising the steps of heating in a non-oxidizing atmosphere the base member, abrasive and brazing metal to a temperature below the melting point of the brazing metal, passing over the surfaces of the base member, abrasive and brazing metal vapors of at least one low boiling point metal selected from the group consisting of zinc and cadmium to condition the surfaces of the abrasive and base member for wetting by melted brazing metal, the temperature being at the boiling point of the metal being vaporized, thereafter increasing the temperature until the brazing metal melts, bringing into mutual contact without substantial pressure the abrasive, the base member and melted brazing metal so that the melted brazing metal flows over and wets the surfaces of the abrasive and base member, and cooling the whole until the brazing metal solidifies thereby bonding the abrasive to the base member.

2. The method of bonding at least one abrasive selected from the group consisting of diamond, alumina and metal carbides to a base member by means of a brazing metal of lower melting point than the base member, comprising the steps of assembling the base member, the abrasive and brazing metal in contacting relation without substantial pressure, heating the assembly in a non-oxidizing atmosphere to a temperature below the melting point of the brazing metal, passing vapors of at least one low boiling metal from the group consisting of zinc and cadmium over the assembly to condition the surfaces of the base member and abrasive for wetting by melted brazing metal, the temperature being at the boiling point of the metal being vaporized, thereafter increasing the temperature of the assembly until the brazing metal melts and flows upon and wets the surface of the base member and abrasive, and cooling the assembly to solidify the brazing metal thereby bonding the abrasive to the base member.

3. The method of bonding at least one abrasive from the group consisting of diamond, alumina and metal carbides to a base member by means of a brazing metal of lower melting point than the base member, comprising the steps of electrodepositing a coating of the brazing metal on selected portions of the base member, assembling the abrasive and the base member so that the abrasive is in contact without substantial pressure with the coating of brazing metal, disposing at least one low boiling point metal from the group consisting of zinc and cadmium adjacent the abrasive and base member, heating the assembly in a non-oxidizing atmosphere to a temperature below the melting point of the brazing metal, but at least at the boiling point of the low boiling metal, to cause vapors of the low boiling point metal to pass over the surfaces of the assembly to condition the abrasive for wetting by molten brazing metal, increasing the temperature until the coating of brazing metal melts and wets the surface of the abrasive in contact therewith, and cooling the assembly so that the brazing metal solidifies and bonds the contacting abrasive to the base member.

4. The method of brazing to a metal base member an abrasive from the group consisting of diamond, alumina and metal carbides by means of a copper base brazing metal, comprising the steps of assembling in proximity but without any substantial pressure to one another the metal base member, a supply of copper base metal, the abrasive and at least one low boiling point metal from the group consisting of zinc and cadmium, heating the assembly in a non-oxidizing atmosphere to a temperature substantially the boiling point of the low boiling point metal so that first the low boiling metal vaporizes substantially completely and the vapors pass over the surfaces of the abrasive, metal base member and brazing metal, then the copper base brazing metal melts and the molten metal contacts and wets the abrasive and the base member, the abrasive being maintained in selected contacting relation with the base member, and cooling the assembly to solidify the copper base metal whereby the abrasive is brazed to the base member.

5. The method of bonding at least one abrasive from the group consisting of diamond, alumina and metal carbides to a metal base member comprising the steps of plating at least one low boiling point metal selected from the group consisting of zinc and cadmium on the metal base member, applying copper base metal and the abrasive in predetermined position about the plated metal, heating the whole to a temperature substantially the boiling point of the low boiling point metal in a non-oxidizing hydrogen atmosphere until the plated metal vaporizes substantially completely and the metal vapors pass over the surfaces of the base member, copper base metal and abrasive, then the copper base metal melts, the melted copper base metal flowing over and wetting the metal base member and the abrasive, and cooling the whole while maintaining the abrasive in contact with the metal base member and the copper base metal until the copper base metal solidifies thereby bonding the abrasive to the base member.

6. The method of bonding at least one abrasive from the group consisting of diamond, alumina and metal carbides to a metal base member comprising the steps of applying a mixture of powdered copper base metal and at least one low boiling metal selected from the group consisting of zinc and cadmium about the metal base member, disposing the abrasive in proximity to the powdered metals and metal base member, heating the whole in a non-oxidizing hydrogen atmosphere until the low boiling point metal vaporizes substantially completely and the metal vapors pass over the surfaces of the abrasive, copper base metal and the metal base member, then the copper base metal melts, maintaining the abrasive in contact with the metal base member while melted copper base alloy flows over and wets both, and then cooling the whole until the copper base alloy solidifies and bonds the abrasive to the metal base member.

7. The process of applying an adherent coating of a copper base metal to an abrasive selected from the group consisting of diamond, alumina and metal carbides, comprising the steps of heating the abrasive and a supply of copper base metal in a non-oxidizing atmosphere to a temperature above 900° C. and below the melting point of the copper base metal, passing the vapors of zinc over the surface of the abrasive to condition the abrasive for wetting by melted copper base metal, increasing the temperature until the copper base metal melts and contacts and wets the abrasive, and cooling the whole to solidify the copper base metal as an adherent coating on the abrasive.

8. The method of bonding at least one abrasive from the group consisting of diamond, alumina and metal carbides to a base member by means of a brazing metal of lower melting point than the base member, comprising the steps of heating in a non-oxidizing atmosphere the base member, abrasive and brazing metal to a temperature below the melting point of the brazing metal, passing over the surfaces of the base member, abrasive and brazing metal vapors of a low boiling point metal selected from the group consisting of zinc and cadmium to condition the surfaces of the abrasive and base member for wetting by melted brazing metal, the temperature being at the boiling point of the metal being vaporized, thereafter increasing the temperature until the brazing metal melts, bringing into mutual contact without substantial pressure the abrasive, the base member and melted brazing metal so that the melted brazing metal flows over and wets the surfaces of the abrasive and base member, cooling the whole until the brazing metal solidifies thereby bonding the abrasive to the base member, and electroplating a metal over the solidified brazing metal to build up metal about the abrasive.

WILLARD P. SWEARINGEN.

REFERENCES CITED

The following references are of record in the file of this patent:

UNITED STATES PATENTS

| Number | Name | Date |
|---|---|---|
| Re. 22,854 | Kott et al. | Mar. 18, 1947 |
| 1,733,241 | Scott | Oct. 29, 1929 |
| 1,848,182 | Koebel | Mar. 8, 1932 |
| 2,020,117 | Johnston | Nov. 5, 1935 |
| 2,077,366 | Milligen | Apr. 13, 1937 |
| 2,136,931 | Benner et al. | Nov. 15, 1938 |
| 2,137,201 | Boyer | Nov. 15, 1938 |
| 2,137,329 | Boyer | Nov. 22, 1938 |
| 2,187,384 | Maier | Jan. 16, 1940 |
| 2,339,208 | Van Der Pyl | Jan. 11, 1944 |
| 2,367,404 | Kott | Jan. 16, 1945 |
| 2,382,666 | Rohrig et al. | Aug. 14, 1945 |